(12) United States Patent
Ono et al.

(10) Patent No.: US 11,767,817 B2
(45) Date of Patent: Sep. 26, 2023

(54) ENGINE SYSTEM

(71) Applicant: Mazda Motor Corporation, Hiroshima (JP)

(72) Inventors: Ryohei Ono, Aki-gun (JP); Yuji Harada, Aki-gun (JP); Kenji Uchida, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 17/869,019

(22) Filed: Jul. 20, 2022

(65) Prior Publication Data

US 2023/0030297 A1 Feb. 2, 2023

(30) Foreign Application Priority Data

Jul. 30, 2021 (JP) ................................ 2021-125487

(51) Int. Cl.
*F02P 5/15* (2006.01)
*F02D 41/40* (2006.01)
*F02P 15/02* (2006.01)

(52) U.S. Cl.
CPC .......... *F02P 5/1516* (2013.01); *F02D 41/401* (2013.01); *F02P 15/02* (2013.01); *F02D 2200/101* (2013.01)

(58) Field of Classification Search
CPC ................. F02B 19/1023; F02B 19/12; F02D 2200/101; F02D 37/02; F02D 41/3035;
(Continued)

(56) References Cited

U.S. PATENT DOCUMENTS 4,180,031 A * 12/1979 Muranaka ............... F02P 15/02
123/638
4,287,862 A * 9/1981 Noguchi .................. F02B 5/00
123/638
(Continued)

FOREIGN PATENT DOCUMENTS

EP          3855008 A1    7/2021
JP       2007255370 A    10/2007
(Continued)

OTHER PUBLICATIONS

European Patent Office, Extended European Search Report Issued in Application 22184448.3, dated Jan. 5, 2023, Germany, 8 pages.

*Primary Examiner* — Carl C Staubach
(74) *Attorney, Agent, or Firm* — Alleman Hall Creasman & Tuttle LLP

(57) ABSTRACT

An engine system is provided, which includes a main combustion chamber, a subchamber, an injector that injects fuel into the main combustion chamber, a main spark plug that ignites a mixture gas inside the main combustion chamber, a subspark plug that ignites the mixture gas inside the subchamber, an exhaust gas recirculation (EGR) device and a control device. In a specific range where EGR is performed, the ignition devices are controlled so that a subignition timing is retarded from a main ignition timing, and an ignition phase difference that is a retard amount of the subignition timing from the main ignition timing becomes larger under a high EGR condition than a low EGR condition, the EGR conditions being conditions in the specific range where engine speeds are the same and EGR rates are different, and the high EGR condition being larger in the EGR rate than the low EGR condition.

20 Claims, 9 Drawing Sheets

(58) Field of Classification Search
CPC ......... F02D 41/401; F02P 15/02; F02P 15/08; F02P 5/045; F02P 5/1502
See application file for complete search history.

(56) References Cited

U.S. PATENT DOCUMENTS

| | | | | |
|---|---|---|---|---|
| 7,740,009 | B2* | 6/2010 | Shelby | F02P 15/08 123/304 |
| 8,006,666 | B2* | 8/2011 | Ashida | F02B 19/12 123/638 |
| 11,156,198 | B1* | 10/2021 | Glugla | F02P 3/05 |
| 11,598,245 | B2* | 3/2023 | Ono | F02B 19/1023 |
| 2002/0038655 | A1* | 4/2002 | Suzuki | F02P 15/08 123/638 |
| 2009/0259387 | A1* | 10/2009 | Kakuya | F02D 41/3035 123/295 |
| 2012/0290195 | A1* | 11/2012 | Irie | F02M 26/13 701/104 |
| 2019/0078498 | A1* | 3/2019 | Bedogni | F02B 19/1019 |
| 2019/0323415 | A1* | 10/2019 | Corrigan | F01N 3/2006 |
| 2021/0222643 | A1* | 7/2021 | Nagatsu | F02P 15/02 |
| 2021/0262393 | A1* | 8/2021 | Leone | F02C 7/266 |
| 2022/0213857 | A1* | 7/2022 | Ohata | F02P 5/1516 |
| 2023/0029629 | A1* | 2/2023 | Ono | F02B 9/02 |
| 2023/0029748 | A1* | 2/2023 | Ono | F02P 5/045 |
| 2023/0030297 | A1* | 2/2023 | Ono | F02M 26/15 |
| 2023/0035754 | A1* | 2/2023 | Ono | F02D 37/02 |
| 2023/0035987 | A1* | 2/2023 | Ono | F02P 15/08 |
| 2023/0037098 | A1* | 2/2023 | Ono | F02B 19/12 |

FOREIGN PATENT DOCUMENTS

| | | |
|---|---|---|
| JP | 2019183809 A | 10/2019 |
| JP | 2020094554 A | 6/2020 |
| WO | 2022106189 A1 | 5/2022 |

* cited by examiner

ENGINE SYSTEM

TECHNICAL FIELD

The present disclosure relates to an engine system provided with a main combustion chamber and a subchamber.

BACKGROUND OF THE DISCLOSURE

Conventionally, in engines mounted on a vehicle, etc., providing a main combustion chamber and a subchamber communicating therewith has been examined, in order to improve fuel efficiency and emission performance. In detail, if the main combustion chamber and the subchamber communicating therewith are provided, and flame generated in the subchamber is blown off to the main combustion chamber, the combustion speed in the main combustion chamber can be increased and fuel efficiency can be improved, and a residue of unburnt mixture gas can be reduced and emission performance can be improved.

For example, JP2007-255370A discloses an engine provided with a main combustion chamber (a main chamber in JP2007-255370A) which is defined by a cylinder block, a cylinder head, and a piston, a subchamber communicating with the main combustion chamber, a main fuel injection valve which is provided to an intake port and supplies fuel to the main combustion chamber via the intake port, a main chamber spark plug which ignites a mixture gas inside the main combustion chamber, a sub fuel injection valve which directly injects fuel into the subchamber, and a subchamber spark plug which ignites the mixture gas inside the subchamber. According to this engine, the mixture gas, which is formed inside the main combustion chamber, and is comprised of fuel injected from the main fuel injection valve, and air, is first ignited by the main chamber spark plug, and the mixture gas which is formed in the subchamber, and is comprised of fuel injected from the sub fuel injection valve, and air, is then ignited by the subchamber spark plug.

The engine of JP2007-255370A is configured so that fuel is injected individually to the main combustion chamber and the subchamber, and therefore requires two fuel injection valves for each cylinder. Thus, the structure is complicated, and it is disadvantageous in terms of cost. In this regard, for the engine having the main combustion chamber and the subchamber, it is possible to provide the fuel injection valve only to the main combustion chamber. However, according to such a configuration in which the fuel injection valve is provided only to the main combustion chamber, the fuel injected from the fuel injection valve may not be fully introduced into the subchamber, and therefore, the mixture gas may not combust appropriately inside the subchamber. That is, there is a possibility that the improvement effect of the fuel efficiency and the emission performance acquired by providing the main combustion chamber and the subchamber may not fully be acquired.

SUMMARY OF THE DISCLOSURE

The present disclosure is made in view of the above situations, and one purpose thereof is to provide an engine system having a main combustion chamber and a subchamber, capable of securely improving fuel efficiency and emission performance.

According to one aspect of the present disclosure, an engine system is provided, which includes a cylinder block and a cylinder head that form a cylinder, a piston reciprocatably accommodated in the cylinder, a main combustion chamber defined by the cylinder block, the cylinder head, and the piston, a subchamber that is separated from the main combustion chamber by a partition, and communicates with the main combustion chamber through a communicating hole formed in the partition, an injector that injects fuel into the main combustion chamber, a main spark plug that ignites a mixture gas inside the main combustion chamber, a subspark plug that ignites the mixture gas inside the subchamber, an exhaust gas recirculation (EGR) device that recirculates part of exhaust gas discharged from the cylinder to an intake passage through which intake air introduced into the cylinder circulates, and a control device that is electrically connected to, and outputs an electric signal for control to, the injector, the main spark plug, the subspark plug, and the EGR device. When the engine is operated in a specific range where part of the exhaust gas is recirculated to the intake passage by the EGR device as EGR gas, the control device controls the main spark plug and the sub spark plug so that a subignition timing that is an ignition timing of the subspark plug is retarded from a main ignition timing that is an ignition timing of the main spark plug, and the control device controls the main spark plug and the subspark plug so that an ignition phase difference that is a retard amount of the subignition timing with respect to the main ignition timing becomes larger under a high EGR condition than a low EGR condition, the high and low EGR conditions being conditions in the specific range in which engine speeds are the same and EGR rates are different, the EGR rates each being a ratio of EGR gas with respect to all gas existing in the main combustion chamber and the subchamber, and the high EGR condition having a greater EGR rate than the low EGR condition.

When EGR gas is recirculated to the intake passage (and to the cylinder), the ratio of the mixture gas (the mixture gas of fuel and air) with respect to all gas in the main combustion chamber becomes smaller. Thus, when the recirculation of EGR gas to the intake passage is performed, the mixture gas becomes difficult to flow into the subchamber, and suitable combustion inside the subchamber becomes difficult to be realized. In this regard, according to this configuration, in the specific range where the EGR gas is recirculated to the intake passage, the subignition timing is retarded from the main ignition timing. When retarding the subignition timing from the main ignition timing, the mixture gas can be combusted in the main combustion chamber with the ignition by the main spark plug, and then the mixture gas can be securely pushed into the subchamber utilizing the pressure increase in the main combustion chamber accompanying the combustion. Therefore, according to this configuration, while introducing the EGR gas into the cylinder, the combustion can be realized appropriately in the subchamber, in addition to in the main combustion chamber, thereby securely improving fuel efficiency and emission performance.

In addition, according to this configuration, the ignition phase difference that is the retard amount of the subignition timing with respect to the main ignition timing becomes larger when the EGR rate is high (under the high EGR condition) than when the EGR rate is low (under the low EGR condition) at the same engine speeds. That is, the period after the introduction of the mixture gas (fuel) into the subchamber begins in connection with the pressure increase in the main combustion chamber, until the ignition by the subspark plug is performed, is longer when the EGR rate is high than when the EGR rate is low. Therefore, when the mixture gas is difficult to be pushed into the subchamber due to the EGR rate being high, the amount of the mixture gas introduced into the subchamber can be secured, and the suitable combustion inside the main combustion chamber and the subchamber can be realized securely. Further, when the mixture gas is comparatively easily pushed into the subchamber due to the EGR rate being low, the combustion inside the subchamber can start at the comparatively early timing after the combustion inside the main combustion chamber starts, and therefore, the combustion period can be shortened and fuel efficiency can be improved more securely.

The control device may control the main spark plug and the subspark plug so that, during operation in the specific range, the ignition phase difference becomes larger as the EGR rate becomes higher.

According to this, the ignition phase difference can be set to a suitable value according to the EGR rate, and therefore, fuel efficiency can be improved more securely while realizing the suitable combustion inside the subchamber.

Here, in expansion stroke, the pressure inside the main combustion chamber falls over time. Thus, when the ignition by the subspark plug is performed in expansion stroke, it becomes especially difficult to introduce the mixture gas from the main combustion chamber to the subchamber. On the other hand, according to this configuration, the mixture gas can be pushed into the subchamber utilizing the pressure increase in the main combustion chamber accompanying the combustion at the main combustion chamber as described above. Therefore, also in a configuration where, during operation in the specific range, the control device sets the subignition timing to a timing in expansion stroke, the amount of the mixture gas inside the subchamber can be secured.

During operation in the specific range, the control device may set the main ignition timing to a timing in compression stroke.

According to this configuration, the mixture gas can be introduced into the subchamber more securely utilizing the pressure increase in the main combustion chamber by the compressing action of the piston, and the pressure increase in the main combustion chamber accompanying the combustion. Therefore, the combustion of the mixture gas inside the subchamber can be realized more securely.

The main spark plug may be attached so that an electrode part thereof is located on an intake port side in a ceiling surface of the main combustion chamber, and the subspark plug may be attached to a position on an exhaust port side in the ceiling surface of the main combustion chamber.

The injector may be disposed so that a tip-end part thereof is located at the center of the ceiling surface of the main combustion chamber.

In a low-load range where an engine load is below a given reference load, the control device may be configured to control the injector to inject fuel during intake stroke.

DETAILED DESCRIPTION OF THE DISCLOSURE

Entire Configuration of Engine

Figure 1:
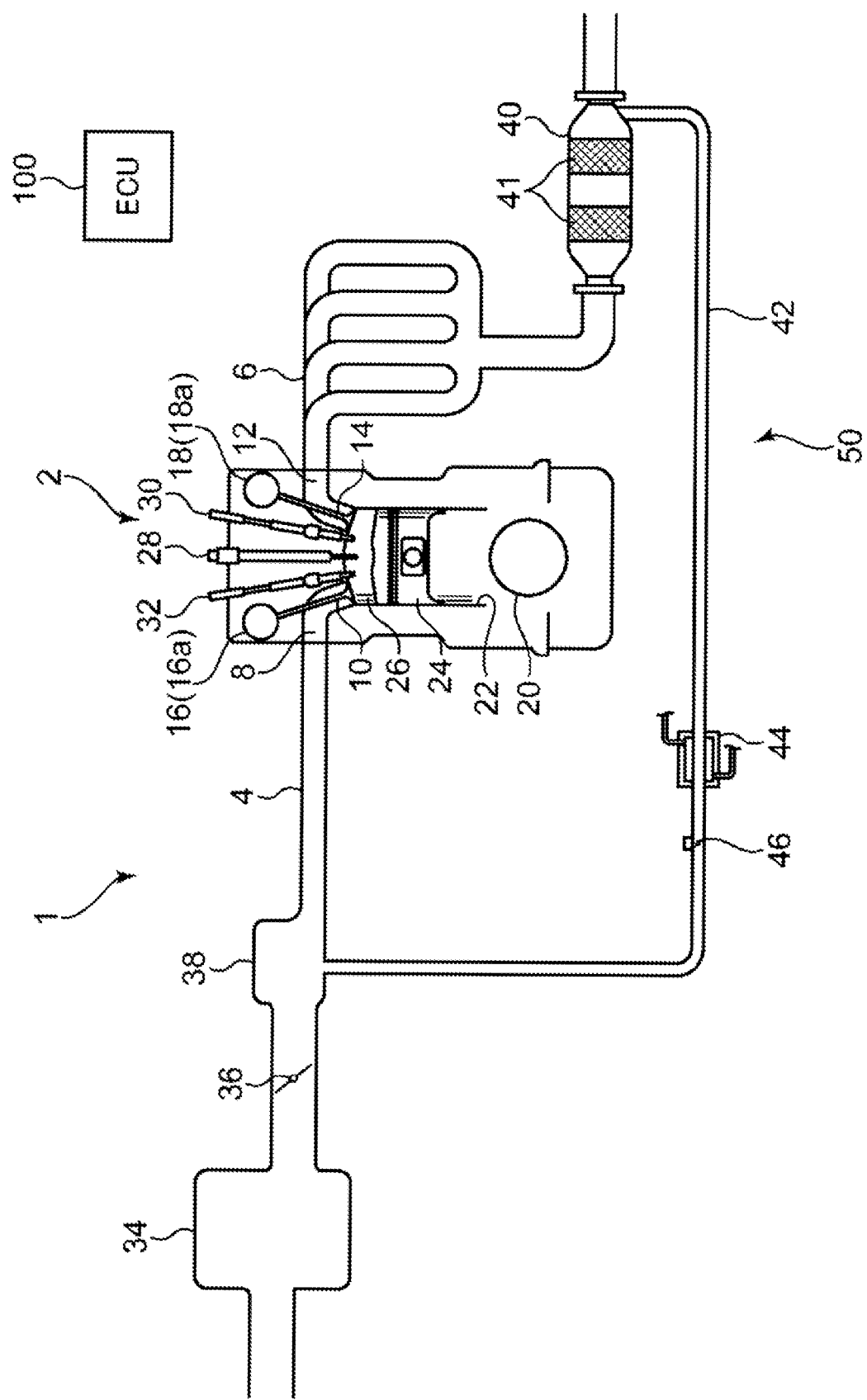
FIG. 1 is an outline block diagram of an engine system according to one embodiment of the present disclosure.

FIG. 1 is an outline block diagram illustrating a desirable embodiment of an engine system of the present disclosure. An engine system 1 includes an engine body 2, an intake passage 4 through which air introduced into the engine body 2 (intake air) circulates, an exhaust passage 6 through which exhaust gas drawn from the engine body 2 circulates, and an exhaust gas recirculation (EGR) device 50. The engine system 1 is mounted on a vehicle, for example, as a power source for propelling the vehicle. The engine body 2 is a four-stroke gasoline engine which mainly uses gasoline as fuel, and fuel containing gasoline is supplied to the engine body 2.

Figure 2:
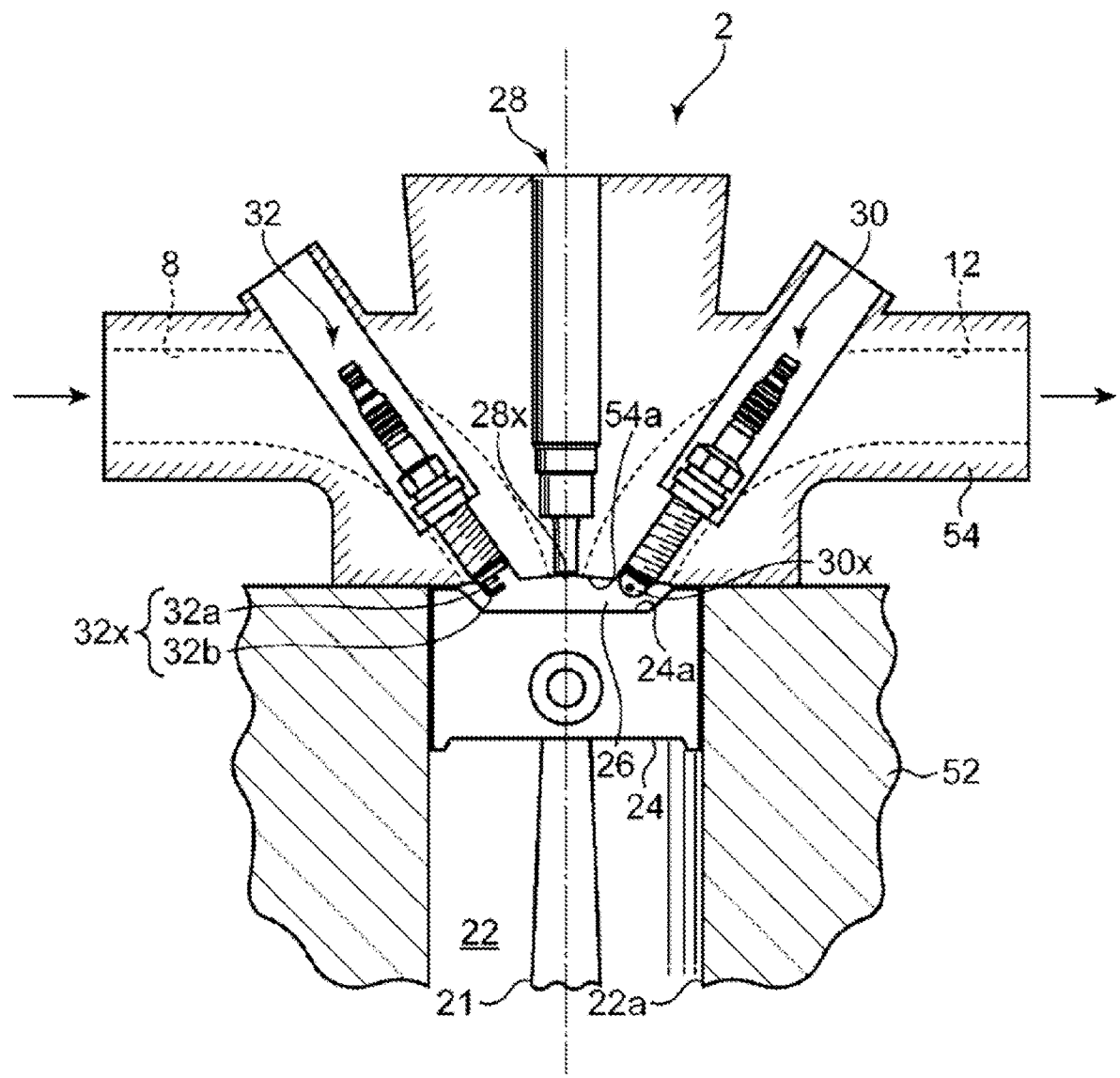
FIG. 2 is an outline cross-sectional view of an engine body.

FIG. 2 is an outline cross-sectional view of the engine body 2. In this embodiment, the engine body 2 is a multi-cylinder engine having a plurality of cylinders 22. For example, the engine body 2 has four cylinders 22 which are lined up single file (lined up in a direction perpendicular to the drawing sheet of FIG. 1). The engine body 2 includes a cylinder block 52 where the plurality of cylinders 22 are formed therein, a cylinder head 54 which has a bottom surface 54*a* which closes upper-end openings of the cylinders 22 and is attached to an upper surface of the cylinder block 52, and a plurality of pistons 24 reciprocatively accommodated in the respective cylinders 22. Note that although in this embodiment the side which goes toward the cylinder head 54 from the cylinder block 52 is treated as "upward" and the opposite side as "downward," these expressions are for facilitating the explanation and are not intended to limit the installation posture of the engine.

Main combustion chambers 26 are defined above the pistons 24 of the cylinders 22, respectively. Each main combustion chamber 26 is formed by an inner circumferential surface 22*a* of the cylinder 22 formed in the cylinder block 52, the bottom surface (lower surface) 54*a* of the cylinder head 54, and a crown surface 24*a* of the piston 24. Fuel is supplied to the main combustion chamber 26 by injection from an injector 28 (described later). The piston 24 reciprocates in the up-and-down direction by receiving an expansion force due to combustion of a mixture gas comprised of fuel and air.

A crankshaft 20 which is an output shaft of the engine body 2 is provided to a lower part of the cylinder block 52 (below the piston 24). The crankshaft 20 is coupled to the piston 24 of each cylinder 22 via a connecting rod 21, and rotates on a center axis according to the reciprocating movement of the piston 24.

In the cylinder head 54, an intake port 8 for introducing air supplied from the intake passage 4 into the main combustion chamber 26, and an exhaust port 12 for deriving the exhaust gas generated inside the main combustion chamber 26 to the exhaust passage 6, are formed for every cylinder 22. In the cylinder head 54, an intake valve 10 for opening and closing an opening of the intake port 8 on the main combustion chamber 26 side, and an exhaust valve 14 for opening and closing an opening of the exhaust port 12 on the main combustion chamber 26 side are provided for every cylinder 22. In this embodiment, two intake valves 10 and two exhaust valves 14 are provided per cylinder 22.

The intake valve 10 and the exhaust valve 14 are opened and closed in an interlocked manner with the rotation of the crankshaft 20 by valve operating mechanisms 16 and 18 disposed in the cylinder head 54, respectively. In the valve operating mechanism 16 for the intake valves 10, a variable valve lift mechanism (intake S-VT) 16a which electrically and variably controls a valve lift and an opening-and-closing timing of each intake valve 10 is provided. Similarly, in the valve operating mechanism 18 for the exhaust valves 14, a variable valve lift mechanism (exhaust S-VT) 18a which electrically and variably controls a valve lift and an opening-and-closing timing of each exhaust valve 14 is provided.

In the cylinder head 54, the injector 28, a main spark plug 32, and a subignition unit 30 are provided to each cylinder 22, as one set.

The injector 28 is an injection valve which injects fuel into the main combustion chamber 26. An injection port through which fuel is injected is formed in a tip-end part 28x of the injector 28. The injector 28 is attached to the cylinder head 54 so that the tip-end part 28x faces the main combustion chamber 26 from above. In this embodiment, the injector 28 is disposed so that its tip-end part 28x is located at the center of a ceiling surface of the main combustion chamber 26 (in detail, on the axis of the cylinder 22).

The main spark plug 32 carries out ignition by spark discharge to the mixture gas inside the main combustion chamber 26. An electrode part 32x for discharging sparks is provided to a tip end of the main spark plug 32. This electrode part 32x includes a center electrode 32a and a side electrode (ground) 32b. The main spark plug 32 is attached to the cylinder head 54 so that its electrode part 32x faces the main combustion chamber 26 from above. In this embodiment, the main spark plug 32 is disposed so that its electrode part 32x is located on the intake port 8 side with respect to the tip-end part 28x of the injector 28, in the ceiling surface of the main combustion chamber 26.

The subignition unit 30 is a device for discharging flame into the main combustion chamber 26. The details of the subignition unit 30 will be described later.

The intake passage 4 is connected to one of a plurality of side surfaces of the cylinder head 54 so as to communicate with the intake port 8 of each cylinder 22. In the intake passage 4, sequentially from an upstream side, an air cleaner 34 which removes foreign matters in intake air, an openable and closable throttle valve 36 which adjusts a flow rate of intake air, and a surge tank 38 are provided.

A downstream end of the intake passage 4 branches to a plurality of passages. The branch passages are connected to the respective intake ports 8. As for each cylinder 22, a swirl valve 56 (see FIG. 5) is provided to the branch passage coupled to one of the two intake ports 8 to open and close the intake port 8.

The exhaust passage 6 is connected to one of the plurality of side surfaces (the opposite side surface from the intake passage 4) of the cylinder head 54 so as to communicate with the exhaust port 12 of each cylinder 22. In the exhaust passage 6, a catalyst device 40 where a catalyst 41, such as a three-way catalyst, is built therein is provided.

The EGR device 50 is a device for recirculating part of the exhaust gas to the intake passage 4 as EGR gas, and introducing (recirculating) it via the intake passage 4 into the main combustion chamber 26 which communicates with the intake passage 4. The EGR device 50 has an EGR passage 42 which communicates the exhaust passage 6 with the intake passage 4, and an EGR valve 46 and an EGR cooler 44 which are provided to the EGR passage 42. An upstream end of the EGR passage 42 is connected to a downstream end of the catalyst device 40 which is a part of the exhaust passage 6 downstream of the catalyst 41, and a downstream end of the EGR passage 42 is connected to the surge tank 38. The EGR valve 46 is a valve which opens and closes the EGR passage 42 to adjust a flow rate of EGR gas. The EGR cooler 44 is a heat exchanger which cools EGR gas. The EGR cooler 44 is disposed upstream of the EGR valve 46.

Subignition Unit 30

Figure 3:
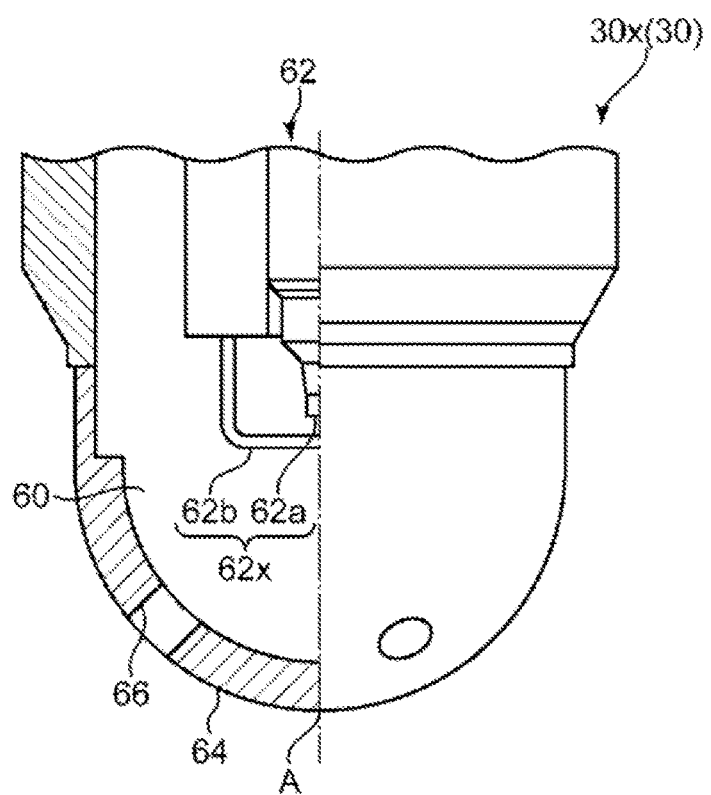
FIG. 3 is a partial cross-sectional view of a tip-end part of a subignition unit when seen from the side.
Figure 4:
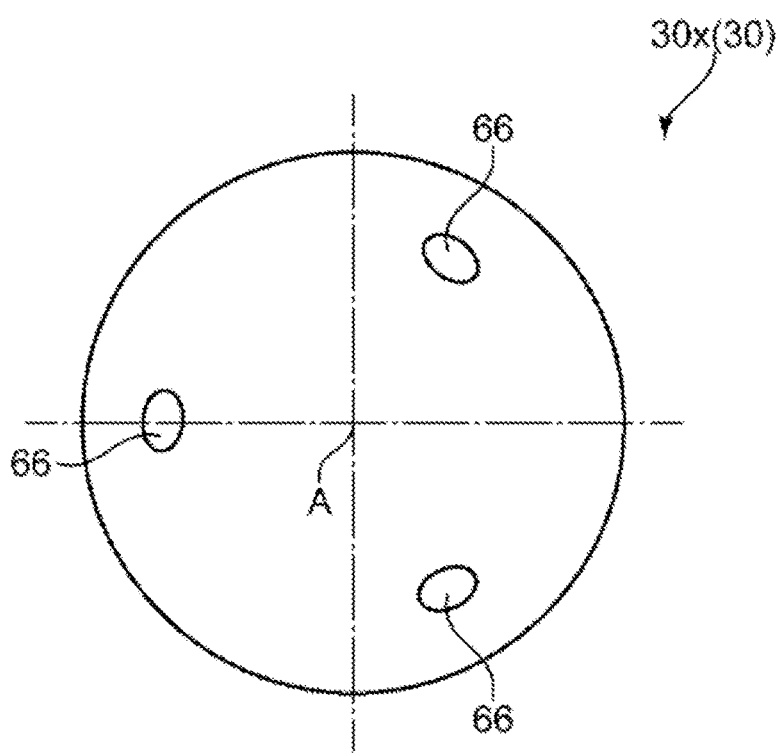
FIG. 4 is a plan view of the tip-end part of the subignition unit.

FIG. 3 is a partial cross-sectional view of a tip-end part 30x of the subignition unit 30 when seen from the side. FIG. 4 is a plan view of the tip-end part 30x of the subignition unit 30 (when seen from the tip-end side).

The subignition unit 30 has a subspark plug 62 which ignites the mixture gas by spark discharge. An electrode part 62x for discharging sparks is provided to a tip end of the subspark plug 62. The electrode part 62x includes a center electrode 62a and a side electrode (ground) 62b. The subignition unit 30 is provided with a cover member 64 which is provided to the tip-end part 30x and covers the electrode part 62x of the subspark plug 62. A subchamber 60 which is a given space is defined inside the cover member 64. In other words, the subspark plug 62 is disposed so that its electrode part 62x faces the subchamber 60, and ignites the mixture gas inside the subchamber 60. The cover member 64 has a hollow semi-spherical shape which bulges to the tip-end side of the subignition unit 30. The cover member 64 is an example of a "partition" of the present disclosure.

As illustrated in FIG. 2, the subignition unit 30 is attached to the cylinder head 54 so that its tip-end part 30x faces the main combustion chamber 26 from above. In this embodiment, the subignition unit 30 is attached to a position of the ceiling surface of the main combustion chamber 26, on the exhaust port 12 side with respect to the injector 28. In this embodiment, in this attached state, substantially the entire cover member 64 is located inside the main combustion chamber 26.

A plurality of communicating holes 66 are formed in the cover member 64, which penetrate the cover member 64 to communicate the main combustion chamber 26 with the subchamber 60. An inside space of the cover member 64 (i.e., the subchamber 60) communicates with the main combustion chamber 26 via these communicating holes 66. Thus, in this embodiment, by attaching the thus-configured subignition unit 30 to the engine body 2, the subchamber 60 is formed in the engine body 2 so that it is divided from the main combustion chamber 26 by the cover member 64, and it communicates with the main combustion chamber 26 via the communicating holes 66.

In this embodiment, three communicating holes 66 are formed in the cover member 64. As illustrated in FIG. 4, the three communicating holes 66 are formed around the axis of the cover member 64 which passes through a vertex A of the cover member 64, at intervals of 120°. Further, as illustrated in FIG. 3, each communicating hole 66 is formed, in a side view, at a position of 45° from the vertex A. Moreover, the radius and the thickness of the cover member 64 are 5 mm and 1 mm, respectively, and the diameter of each communicating hole 66 is 1.2 mm.

The subignition unit 30 discharges flame to the main combustion chamber 26. In detail, when fuel is injected into the main combustion chamber 26 from the injector 28 and the mixture gas of air and fuel is formed inside the main combustion chamber 26, a part of the mixture gas is introduced into the subchamber 60 via the communicating holes 66. When the spark discharge is performed by the subspark plug 62 in a state where a sufficient amount of the mixture gas exists inside the subchamber 60, the mixture gas starts combustion inside the subchamber 60, and flame propagates from near the electrode part 62x of the subspark plug 62 to the circumference. Then, this flame is discharged/ejected to the main combustion chamber 26 via the communicating holes 66, and propagates to the mixture gas inside the main combustion chamber 26.

Here, as described above, when the ignition by the main spark plug 32 is performed, the flame also propagates to the circumference from near the electrode part 32x of the main spark plug 32. Thus, if ignition is performed by both the main spark plug 32 and the subspark plug 62, and the mixture gas combust appropriately inside the main combustion chamber 26 and the subchamber 60, the flame will propagate to the mixture gas inside the main combustion chamber 26 from a plurality of positions. Therefore, the combustion speed of the mixture gas inside the main combustion chamber 26 is increased and fuel efficiency is improved, and generation of knocking and residue of unburnt mixture gas are suppressed.

Control System

Figure 5:
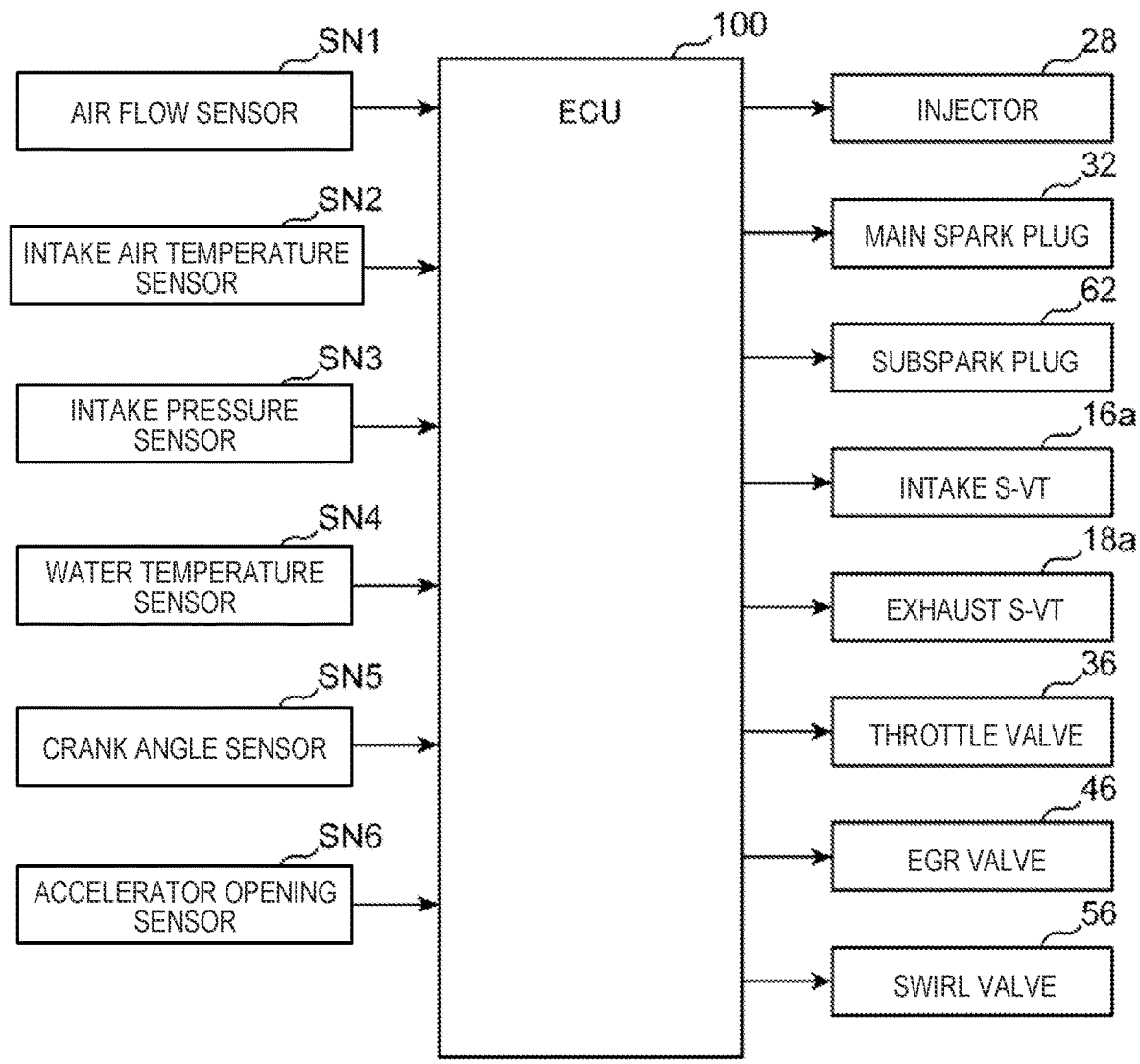
FIG. 5 is a view illustrating a control block of the engine.

FIG. 5 is a block diagram illustrating a control system of the engine. An electronic control unit (ECU) 100 illustrated in the figure is a device which comprehensively controls the engine, and is comprised of a microcomputer including a processor (e.g., a central processing unit (CPU)) which performs various calculation processings, memory such as a ROM and a RAM, and various kinds of input and output buses. The ECU 100 is an example of a "control device" of the present disclosure.

Detection information by the various sensors are inputted into the ECU 100. For example, detection values, from an air flow sensor SN1, an intake air temperature sensor SN2, an intake pressure sensor SN3, a water temperature sensor SN4, and a crank angle sensor SN5, which are provided to the engine system 1, and from an accelerator opening sensor SN6 which is provided to the vehicle, are inputted into the ECU 100. The air flow sensor SN1 detects a flow rate of intake air which passes through the intake passage 4 and is introduced into the engine body 2. The intake air temperature sensor SN2 and the intake pressure sensor SN3 detect a temperature and a pressure of intake air introduced into the engine body 2, respectively. The water temperature sensor SN4 detects a temperature of engine coolant for cooling the engine body 2. The crank angle sensor SN5 detects a crank angle which is a turning angle of the crankshaft 20, and an engine speed. The accelerator opening sensor SN6 detects an accelerator opening which is an opening of an accelerator pedal (not illustrated) mounted on the vehicle.

The ECU 100 performs various determinations, calculations, etc. based on the input signals from the various sensors. The ECU 100 is electrically connected to the injector 28, the main spark plug 32, the subspark plug 62, the EGR device 50 (in detail, the EGR valve 46), etc., and outputs electric signals for control to these devices based on the calculation results, etc.

Figure 6:
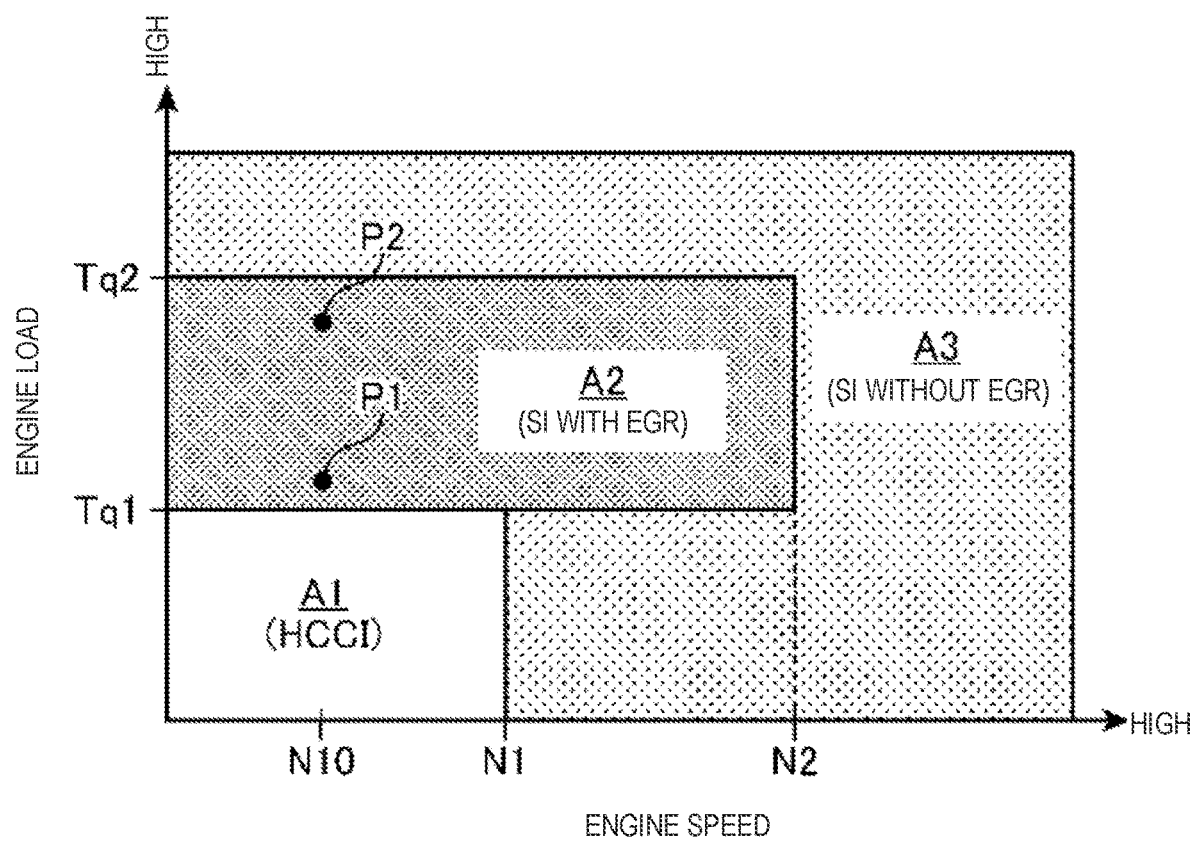
FIG. 6 is a map illustrating an operating range of the engine.

FIG. 6 is a map illustrating an operating range of the engine, where the horizontal axis is an engine speed and the vertical axis is an engine load. As illustrated in FIG. 6, the operating range of the engine is roughly divided into three ranges A1-A3 (a first range A1, a second range A2, and a third range A3) according to the control contents of the injector 28 and the spark plugs 32 and 62.

The first range A1 is a low-speed low-load range where the engine speed is below a given first engine speed N1 and the engine load is below a given first load Tq1. The second range A2 is a low-speed middle-load range where the engine speed is below a given second engine speed N2 and the engine load is above the first load Tq1 and below a given second load Tq2. The third range A3 is other ranges. The second range A2 is an example of a "specific range" of the present disclosure.

In the first range A1, the injector 28 and the spark plugs 32 and 62 are controlled so that HCCI (Homogeneous Compression Charge Ignition) combustion is realized. In detail, in the first range A1, fuel is injected from the injector 28 in intake stroke. Further, the drive of the spark plugs 32 and 62 (ignition by these spark plugs 32 and 62) is suspended.

The injector 28 faces the main combustion chamber 26 as described above, and fuel injected from the injector 28 is diffusible throughout the main combustion chamber 26. Thus, in the first range A1, by fuel being injected from the injector 28 in intake stroke, fuel and air are fully mixed inside the main combustion chamber 26 by the time it reaches a compression top dead center. Then, in the first range A1, this fully-mixed mixture gas (premixed mixture gas) self-ignites near the compression top dead center by becoming high in the temperature and the pressure by the compression of the piston 24.

In the HCCI combustion, the air-fuel ratio of the mixture gas (a ratio of the air weight inside the main combustion chamber 26 to the fuel weight inside the main combustion chamber 26) can be made leaner (higher) to a level where flame propagation is impossible, to improve fuel efficiency. Thus, in the first range A1, the opening of the throttle valve 36 is adjusted so that the air-fuel ratio of the mixture gas inside the main combustion chamber 26 becomes leaner (higher) than a stoichiometric air-fuel ratio (14.7:1).

In ranges other than the first range A1 (the second range A2 and the third range A3), the main spark plug 32 and the subspark plug 62 are activated to realize flame propagation combustion. That is, in these ranges A2 and A3, the flame kernel is generated around the electrode parts 32x and 62x of the spark plugs 32 and 62 by the spark discharge from the electrode parts 32x and 62x, and the flame propagates from the flame kernel to the circumference, thereby realizing spark ignition (SI) combustion in which the mixture gas inside the main combustion chamber 26 and the subchamber 60 combust. Further, in these ranges A2 and A3, the opening of the throttle valve 36 is adjusted so that the air-fuel ratio of the mixture gas inside the main combustion chamber 26 becomes near the stoichiometric air-fuel ratio.

Here, in a range where the engine load is particularly low, combustion tends to be unstable when EGR is carried out in which EGR gas is recirculated to the intake passage 4 and the main combustion chamber 26. Further, in a range where the engine load or the engine speed is particularly high, a sufficient amount of air may not be introduced into the main combustion chamber 26 when the EGR is carried out. Thus, the EGR is suspended in the third range A3. That is, in the third range A3, the EGR valve 46 is fully closed. On the other hand, in the second range A2 of the low-speed middle-load range, since an improvement in fuel efficiency accompanying reductions of pumping loss and cooling loss can be expected by the execution of the EGR, the EGR is carried out. That is, in the second range A2, the EGR valve 46 is opened to recirculate the EGR gas to the intake passage 4 and the main combustion chamber 26.

Control Content in Second Range A2

Figure 7:
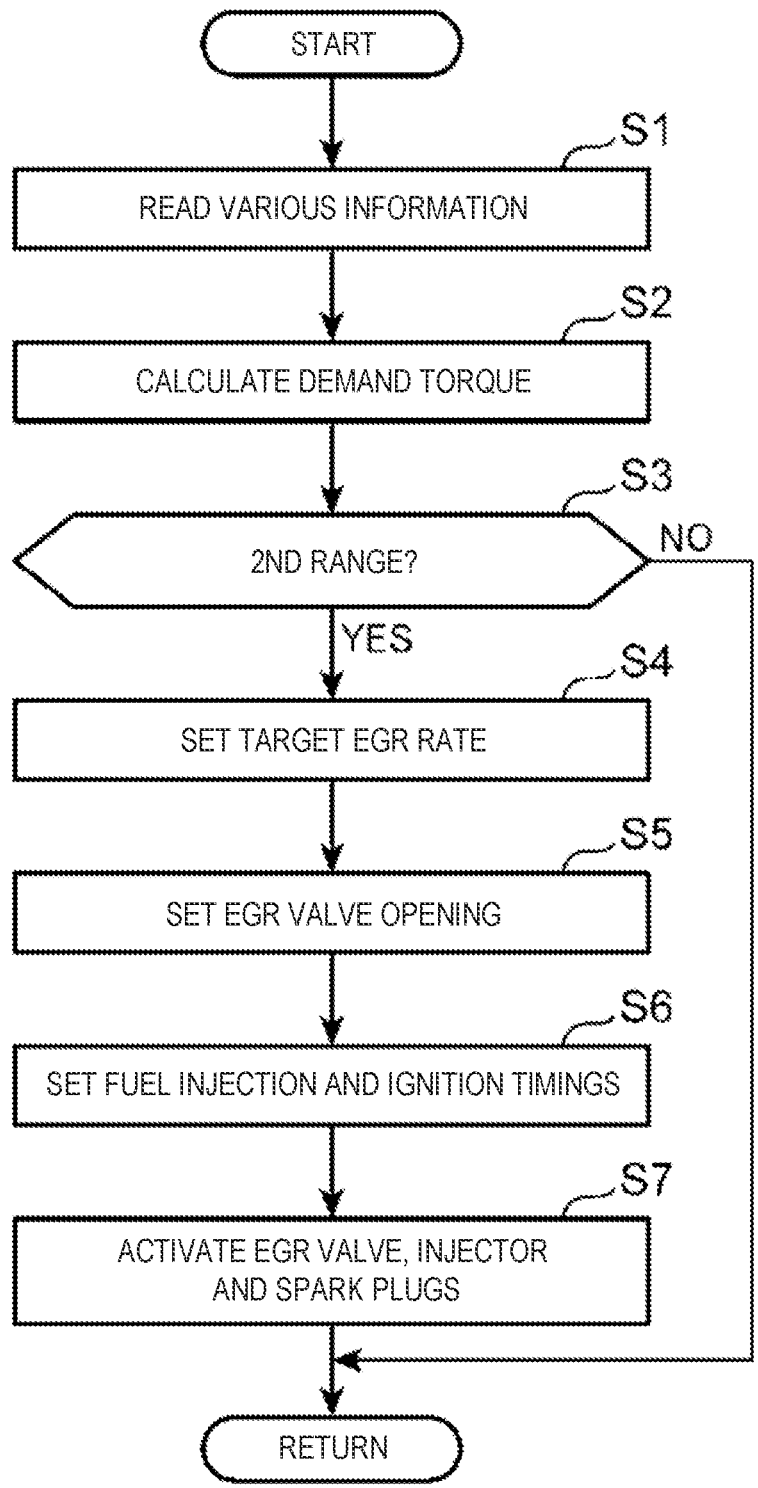
FIG. 7 is a flowchart illustrating a control procedure of an injector and spark plugs in a second range.

Next, the control content in the second range A2 that is one feature of the present disclosure is described. FIG. 7 is a flowchart illustrating a flow of the entire control procedure of the EGR valve 46, the injector 28, the main spark plug 32, and the subspark plug 62 in the second range A2, which is carried out by the ECU 100.

The ECU 100 first reads variety of information (Step S1). The ECU 100 reads the engine speed detected by the crank angle sensor SN5, the accelerator opening detected by the accelerator opening sensor SN6, etc.

Next, the ECU 100 calculates a demand torque which is a torque required for the engine (i.e., the engine load) (Step S2). The ECU 100 calculates the demand torque (engine load) based on the engine speed and the accelerator opening which are read at Step S1.

Next, the ECU 100 determines whether an operating point of the engine falls within the second range A2 (Step S3). In detail, the ECU 100 determines whether the current operating point of the engine falls within the second range A2 based on the engine speed read at Step S1 and the demand torque (engine load) calculated at Step S2.

If the determination at Step S3 is NO, and if the operating point of the engine does not fall within the second range A2, the ECU 100 ends this processing (it carries out the control of the first range A1 or the third range A3). On the other hand, if the determination at Step S3 is YES and the operating point of the engine falls within the second range A2, the ECU 100 shifts to Step S4.

At Step S4, the ECU 100 sets a target value of an EGR rate based on the engine speed and the engine load. The EGR rate is a ratio of EGR gas with respect to all gas which exists in the main combustion chamber 26 and the subchamber 60. In detail, the EGR rate is a weight ratio of the combined weight of the EGR gas which exists in the main combustion chamber 26 and the subchamber 60 with respect to the total weight of all gas which exists in the main combustion chamber 26 and the subchamber 60.

Next, the ECU 100 calculates an opening of the EGR valve 46 by which the target EGR rate set at Step S4 can be realized (Step S5). For example, the ECU 100 calculates the opening of the EGR valve 46 by which the target EGR rate can be realized based on the target EGR rate set at Step S4, the engine speed, the amount of intake air detected by the air flow sensor SN1, etc.

Further, the ECU 100 sets a fuel injection timing which is a timing when a fuel injection by the injector 28 is started, a main ignition timing which is an ignition timing of the main spark plug 32 (a timing by the crank angle at which the main spark plug 32 carries out ignition or spark discharge), and a subignition timing which is an ignition timing of the subspark plug 62 (a timing by the crank angle at which the subspark plug 62 carries out ignition or spark discharge) (Step S6).

Next, at Step S7, the ECU 100 sets the opening of the EGR valve 46 at the opening calculated at Step S5. In detail, the ECU 100 issues a command to a drive for opening and closing the EGR valve 46 to set the opening of the EGR valve 46 at the opening set at Step S5. Further, the ECU 100 activates the injector 28 so that the fuel injection is started at the fuel injection timing set at Step S6. The ECU 100 activates the main spark plug 32 so that the ignition by the main spark plug 32 is performed at the main ignition timing set at Step S6. Further, the ECU 100 activates the subspark plug 62 so that the ignition by the subspark plug 62 is performed at the subignition timing set at Step S6.

The details of the fuel injection timing, the main ignition timing, and the subignition timing which are set at Step S6, and the target EGR rate set at Step S4 are described below.

Figure 8:
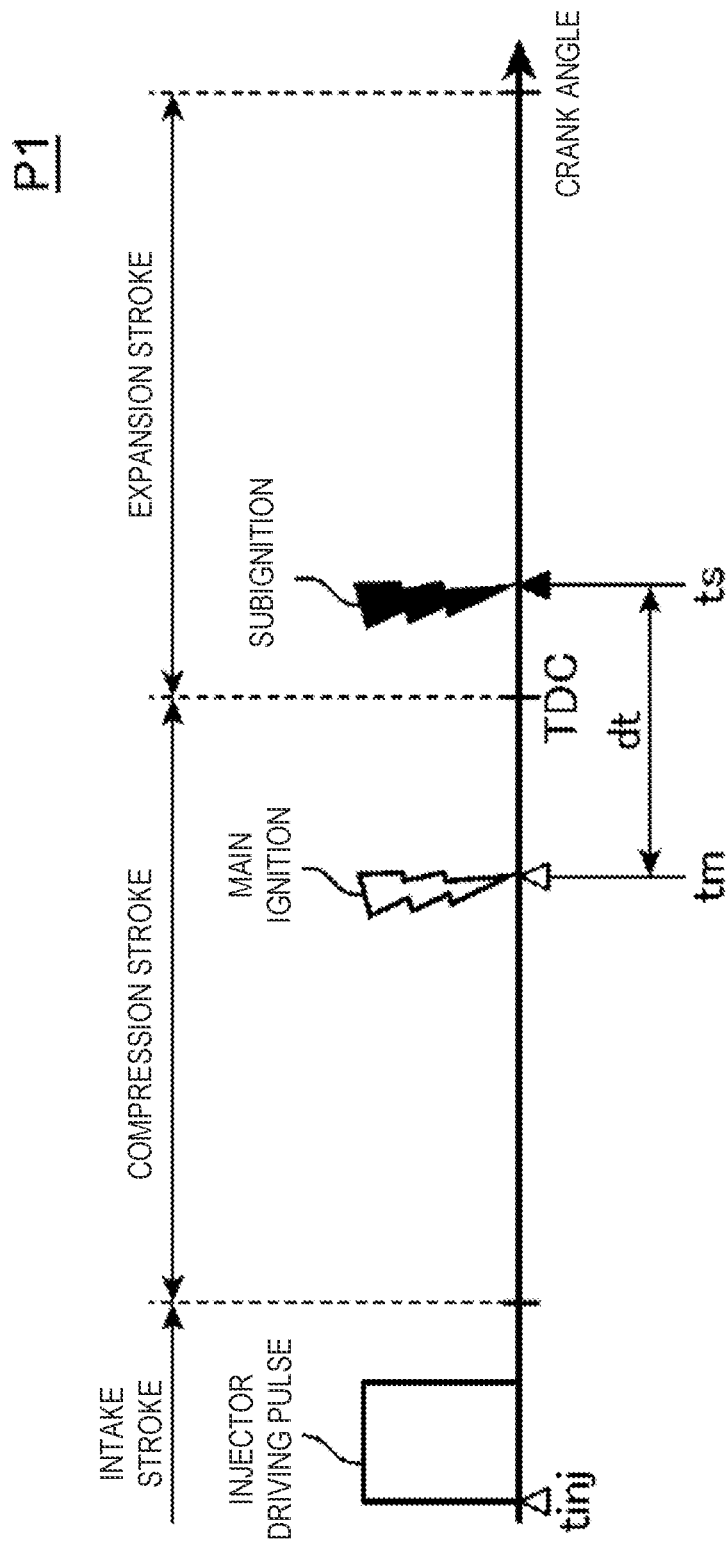
FIG. 8 is a view illustrating one example of a driving pulse of the injector, a main ignition timing, and a subignition timing in the second range.
Figure 9:
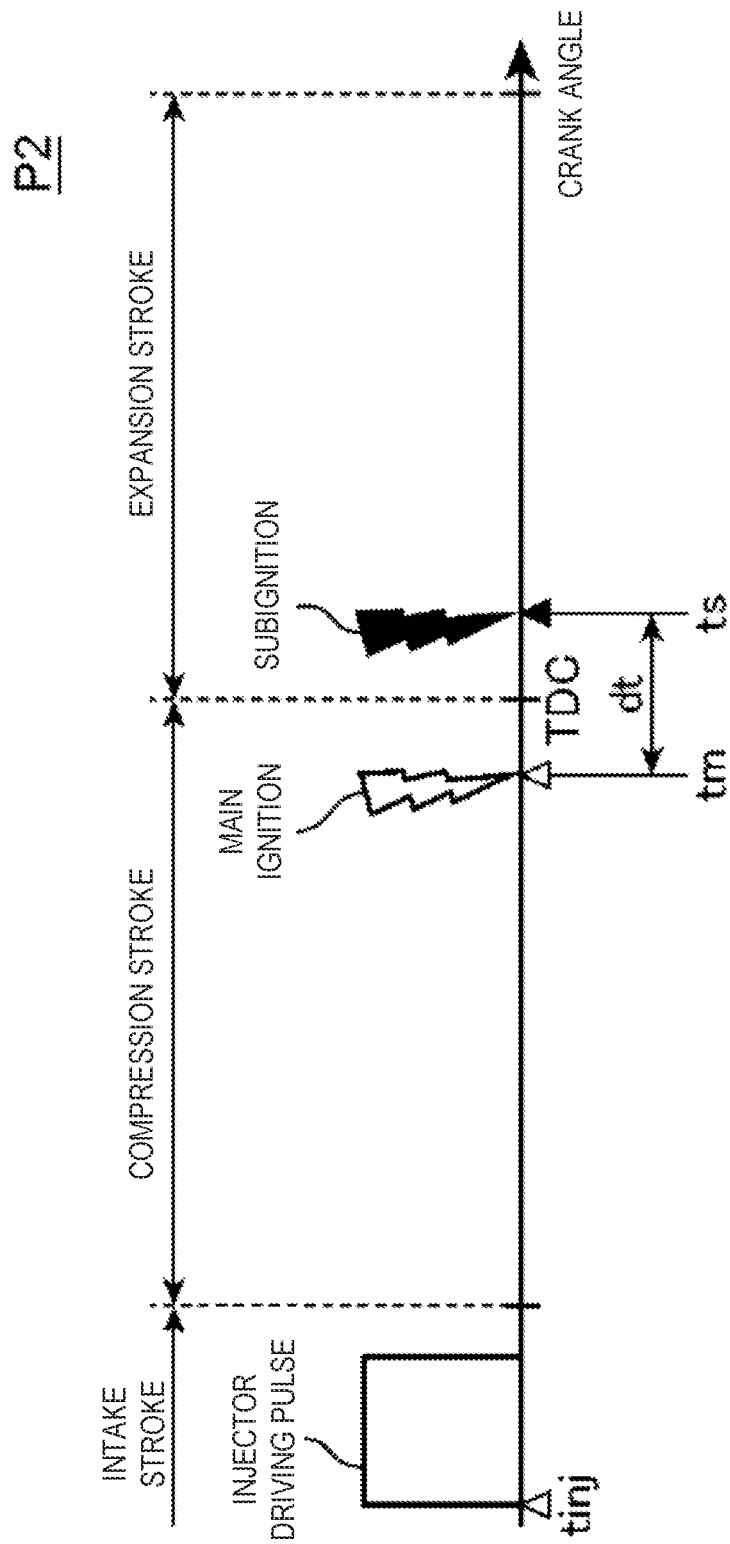
FIG. 9 is a view illustrating another example of the driving pulse of the injector, the main ignition timing, and the subignition timing in the second range.

FIGS. 8 and 9 are views illustrating a driving pulse of the injector 28, a main ignition timing tm, and a subignition timing ts, at operating points P1 and P2 which are included in the second range A2, respectively. As illustrated in FIG. 6, the operating point P2 is a point where the engine speed is an engine speed N10 which is the same as the operating point P1, and the engine load is higher than the operating point P1.

As illustrated in FIGS. 8 and 9, in the second range A2, a fuel injection timing tinj is set to the timing in intake stroke, and the fuel injection from the injector 28 into the main combustion chamber 26 is started in the intake stroke.

In the second range A2, since the EGR is carried out, the target EGR rate is set to a value larger than 0. Here, when the engine load becomes higher, an amount of air to be introduced into the main combustion chamber 26 increases. Therefore, when a large amount of EGR gas is recirculated to the intake passage 4 and the main combustion chamber 26 while the engine load is high, a sufficient amount of air cannot be introduced into the main combustion chamber 26. Thus, in the second range A2, among the two operating points (for example, operating points P1 and P2) where the engine speeds are the same and the engine loads are different, the target EGR rate at the operating point (P1) where the engine load is low is set to a value higher than the target EGR rate at the operating point (P2) where the engine load is high.

As described above, the target EGR rate is realized by the opening adjustment of the EGR valve 46. Thus, in the second range A2, at the two operating points (for example, operating points P1 and P2) where the engine speeds are the same and the engine loads are different, the EGR rate at the operating point (P1) where the engine load is low becomes larger than the EGR rate at the operating point (P2) where the engine load is high.

As illustrated in FIGS. 8 and 9, in the second range A2, the main ignition timing tm is advanced from the subignition timing ts so that the ignition by the main spark plug 32 is first performed, and the ignition by the subspark plug 62 is then performed. In this embodiment, the main ignition timing tm is set at a timing in compression stroke, and the subignition timing ts is set at a timing in expansion stroke.

Although the firing order described above is realized in the entire second range A2, the retard amount of the subignition timing ts with respect to the main ignition timing tm (i.e., an ignition phase difference dt which is a period by the crank angle from the main ignition timing to the subignition timing ts) is varied depending on the operating point. As illustrated in FIGS. 8 and 9, in the second range A2, at the two operating points (for example, operating points P1 and P2) where the engine speeds are the same and the engine loads are different, the ignition phase difference dt at the operating point (P1) where the engine load is low is larger than the ignition phase difference dt at the operating point (P2) where the engine load is high. As described above, the EGR rate becomes higher as the engine load becomes lower. Thus, at the two operating points (for example, operating points P1 and P2) where the engine speeds are the same and the engine loads are different, the ignition phase difference dt is larger at the operating point (P1) where the EGR rate is high than the operating point (P2) where the EGR rate is low.

In this embodiment, at the two operating points (for example, the operating points P1 and P2) where the engine speeds are the same and the engine loads are different, the main ignition timing tm is set so that the main ignition timing tm at the operating point (P1) where the engine load is low and the EGR rate is high is advanced from the main ignition timing tm at the operating point (P2) where the engine load is high and the EGR rate is low. Further, the subignition timing ts is set so that the subignition timing ts at the operating point (P1) where the engine load is low and the EGR rate is high is retarded from the main ignition timing tm at the operating point (P2) where the engine load is high and the EGR rate is low. Further, according to the setting of these timings, the ignition phase difference dt at the operating point (P1) where the engine load is low and the EGR rate is high is larger than the ignition phase difference dt at the operating point (P2) where the engine load is high and the EGR rate is low. Note that at the two operating points (for example, operating points P1 and P2) where the engine speeds are the same and the engine loads are different, the operating point (P1) where the engine load is low and the EGR rate is high is an example of a "high EGR condition" in the present disclosure, and the operating point (P2) where the engine load is high and the EGR rate is low is an example of a "low EGR condition" in the present disclosure.

Figure 10:
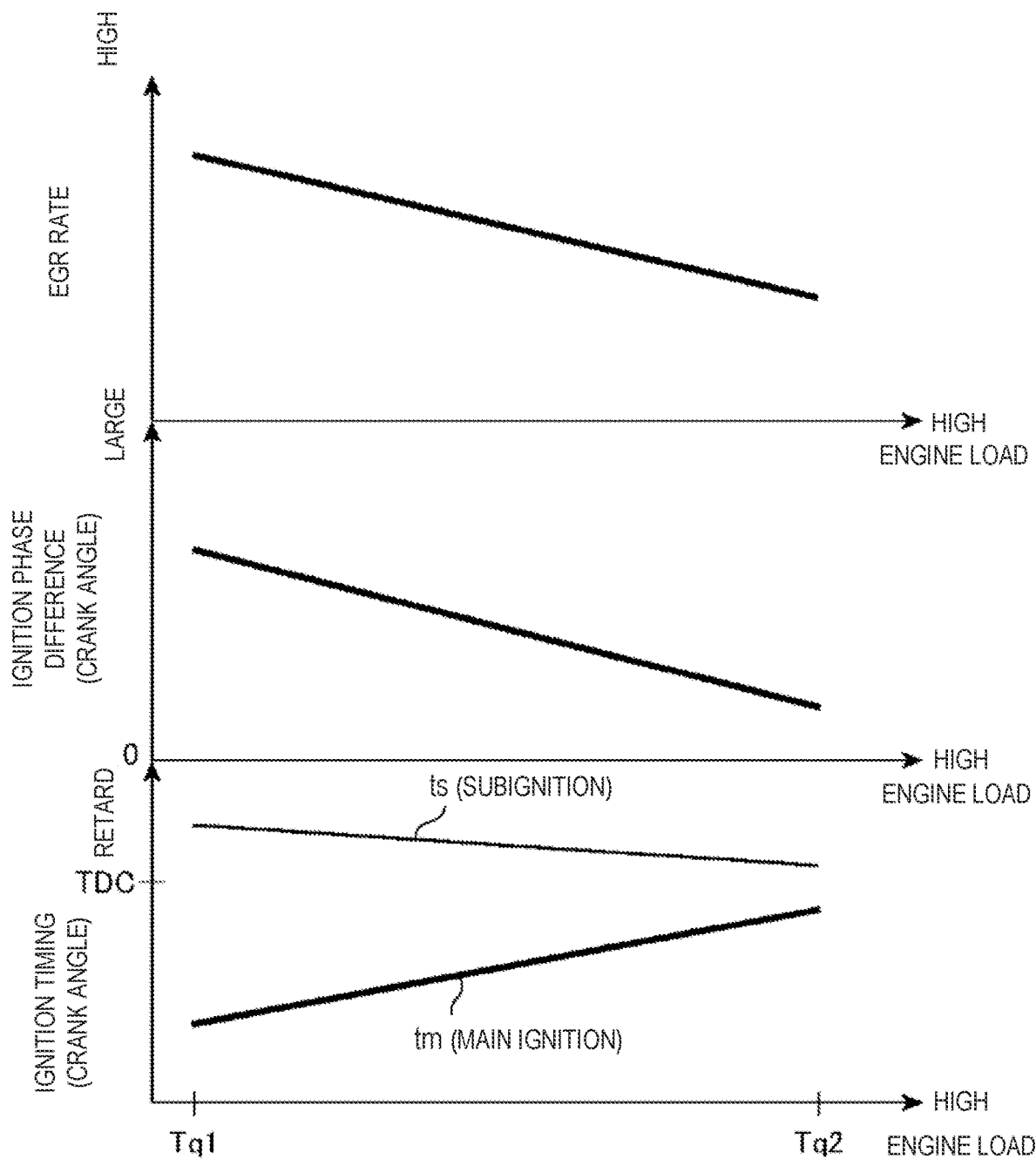
FIG. 10 is a view illustrating a relationship between an engine load and each parameter in the second range.

FIG. 10 is a view illustrating a relationship between the engine load and each parameter in the second range A2. The top graph of FIG. 10 is a graph illustrating a relationship between the engine load and the target EGR rate (eventually, the EGR rate (actual EGR rate)). The second graph of FIG. 10 is a graph illustrating a relationship between the engine load and the ignition phase difference dt. The third graph of FIG. 10 is a graph illustrating a relationship between the engine load, and the main ignition timing tm and the subignition timing ts. Note that these graphs illustrate a relationship between the engine load and each parameter while the engine speed is fixed.

As illustrated in FIG. 10, in the second range A2, the target EGR rate is set to a higher value as the engine load becomes lower, and, thereby, the EGR rate (actual EGR rate) is controlled to be a higher value as the engine load becomes lower. In this embodiment, the target EGR rate and the EGR rate are increased substantially in proportion to the decrease in the engine load.

Further, in the second range A2, the main ignition timing tm is advanced and the subignition timing ts is retarded as the engine load becomes lower (i.e., as the EGR rate becomes higher). The ignition phase difference dt is controlled to be a larger value as the engine load becomes lower (i.e., as the EGR rate becomes higher). In this embodiment, the main ignition timing tm is advanced and the subignition timing ts is retarded, substantially in proportion to the decrease in the engine load (i.e., the increase in the EGR rate). In addition, the ignition phase difference dt is increased substantially in proportion to the decrease in the engine load (i.e., the increase in the EGR rate). Further, in this embodiment, these ignition timings tm and ts are set so that the advance amount of the main ignition timing tm with respect to the change amount of the engine load (i.e., the change amount of the EGR rate) becomes larger than the retard amount of the subignition timing ts.

Note that, in this embodiment, the target EGR rate and each timing (the fuel injection timing tinj, the main ignition timing tm, the subignition timing ts) which are set as described above are stored beforehand in the ECU 100 as a map with respect to the engine speed and the engine load. At Steps S4 and S6 described above, the ECU 100 extracts values corresponding to the current engine load and the current engine speed from the map stored in the ECU 100.

Operation, etc.

As described above, in this embodiment, in the second range A2 where the EGR is carried out, the main ignition timing tm is advanced from the subignition timing ts, and ignition is performed to the mixture gas inside the subchamber 60 by the subspark plug 62 after ignition is performed to the mixture gas inside the main combustion chamber 26 by the main spark plug 32. Therefore, the mixture gas can be combusted appropriately inside both the main combustion chamber 26 and the subchamber 60.

In detail, in the second range A2, in addition to air, the EGR gas is introduced into the main combustion chamber 26 by carrying out the EGR. Therefore, in the second range A2, it becomes difficult to push the sufficient amount of the mixture gas into the subchamber 60 from the main combustion chamber 26 only with the compressing action of the piston 24. Particularly, in this embodiment, in the second range A2, since the subignition timing ts is set to the timing in expansion stroke (i.e., the timing in the middle of the pressure inside the main combustion chamber 26 decreasing), the sufficient amount of the mixture gas may not be introduced into the subchamber 60 from the main combustion chamber 26 only with the compressing action of the piston 24. Further, unless the sufficient amount of the mixture gas is introduced into the subchamber 60, a misfire may occur even if the subspark plug 62 performs the ignition (spark discharge), and therefore, the suitable combustion of the mixture gas inside the subchamber 60 cannot be realized.

On the other hand, when the ignition by the main spark plug 32 is performed before the ignition by the subspark plug 62 as the firing order described, the inflow of the mixture gas to the subchamber 60 can be stimulated by the pressure increase accompanying the combustion of the mixture gas inside the main combustion chamber 26, and therefore, the sufficient amount of the mixture gas can be pushed into the subchamber 60. Particularly, in this embodiment, the main ignition timing tm is the timing in compression stroke. Therefore, the sufficient amount of the mixture gas can be introduced into the subchamber 60 more securely utilizing the pressure increase in the main combustion chamber 26 by the compressing action of the piston 24, and the pressure increase in the main combustion chamber 26 accompanying combustion.

Therefore, according to this embodiment, the mixture gas can be combusted appropriately in the subchamber 60, in addition to the main combustion chamber 26, thereby securely improving fuel efficiency and emission performance.

In addition, at the two operating points (for example, the operating points P1 and P2) included in the second range A2, where the engine speeds are the same and the engine loads are different, the ignition phase difference dt at the operating point (P1) where the engine load is low and the EGR rate is high is larger than the ignition phase difference dt at the operating point (P2) where the engine load is high and the EGR rate is low. That is, the period after the introduction of the mixture gas (fuel) into the subchamber 60 begins in connection with the ignition by the main spark plug 32 being performed and the pressure inside the main combustion chamber 26 increasing, until the ignition by the subspark plug 62 is performed, is longer when the EGR rate is high than when the EGR rate is low.

Therefore, even when the mixture gas is particularly difficult to be pushed into the subchamber 60 due to the EGR rate being high, the sufficient amount of the mixture gas can be securely introduced into the subchamber 60 before the ignition by the subspark plug 62, and therefore, the suitable combustion of the mixture gas inside the subchamber 60 can be realized more securely. Further, when the mixture gas is comparatively easily pushed into the subchamber 60 due to the EGR rate being low, the combustion inside the subchamber 60 can start at the comparatively early timing after the combustion inside the main combustion chamber 26 starts, and therefore, the combustion period can be shortened and fuel efficiency can be improved more securely.

Particularly, in this embodiment, in the second range A2, the ignition phase difference dt becomes larger as the engine load becomes lower and the EGR rate becomes higher. Therefore, the ignition phase difference dt can be set to a suitable value according to the EGR rate, and therefore, the suitable combustion inside the subchamber 60 can securely be realized, and the shortening of the combustion period can improve fuel efficiency more securely.

Modifications

The concrete shape and size of the cover member 64 of the subignition unit 30 are not limited to the above configuration. Further, the number and size of the communicating holes 66 formed in the cover member 64 are not limited to the above configuration. Moreover, the attached position of the subignition unit 30 is not limited to the above position. For example, the subignition unit 30 may be provided to the intake port 8 side with respect to the tip-end part 28x of the injector 28.

In the second range A2, the ignition phase difference dt becomes larger as the EGR rate becomes higher in the above embodiment. However, at the two operating points included in the second range A2, where the engine speeds are the same and the EGR rates are different, the relationship between the EGR rate and the ignition phase difference dt is not limited to the relationship in the above embodiment, but may have such a relationship that the ignition phase difference dt at the operating point where the EGR rate is high becomes larger than the ignition phase difference dt at the operating point where the EGR rate is low. For example, the second range A2 may be divided into a high EGR rate range and a low EGR rate range, and the ignition phase difference dt may be larger on the high EGR rate side than the ignition phase difference dt on the low EGR rate side. Alternatively, the ignition phase difference dt may be fixed regardless the EGR rate in each of the high EGR rate range and the low EGR rate range.

Further, the control contents of the first range A1 and the third range A3 are not limited to the above controls.

Further, the detailed structure, such as the number of cylinders of the engine body 2, is not limited to the above structure.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Engine System
2 Engine Body
4 Intake Passage
24 Piston
28 Injector
26 Main Combustion Chamber
30 Subignition Unit
32 Main Spark Plug
46 EGR Valve
50 EGR Device
52 Cylinder Block
54 Cylinder Head
60 Subchamber
62 Sub spark Plug
64 Cover Member (Partition)
66 Communicating Hole
100 ECU (Control Device)

What is claimed is:

1. An engine system, comprising:
a cylinder block and a cylinder head that form a cylinder;
a piston reciprocatably accommodated in the cylinder;
a main combustion chamber defined by the cylinder block, the cylinder head, and the piston;
a subchamber that is separated from the main combustion chamber by a partition, and communicates with the main combustion chamber through a communicating hole formed in the partition;
an injector that injects fuel into the main combustion chamber;
a main spark plug that ignites a mixture gas inside the main combustion chamber;
a subspark plug that ignites the mixture gas inside the subchamber;
an exhaust gas recirculation (EGR) device that recirculates part of exhaust gas discharged from the cylinder to an intake passage through which intake air introduced into the cylinder circulates; and
a control device that is electrically connected to, and outputs an electric signal for control to, the injector, the main spark plug, the subspark plug, and the EGR device, wherein
when the engine is operated in a specific range where part of the exhaust gas is recirculated to the intake passage by the EGR device as EGR gas, the control device is configured to:
control the main spark plug and the subspark plug so that a subignition timing that is an ignition timing of the subspark plug is retarded from a main ignition timing that is an ignition timing of the main spark plug, and
control the main spark plug and the subspark plug to further advance the main ignition timing and further retard the subignition timing under a high EGR condition compared to a low EGR condition so that an ignition phase difference that is a retard amount of the subignition timing with respect to the main ignition timing becomes larger under the high EGR condition than the low EGR condition, the high and low EGR conditions being conditions in the specific range in which engine speeds are the same and EGR rates are different, the EGR rates each being a ratio of EGR gas with respect to all gas existing in the main combustion chamber and the subchamber, and the high EGR condition having a greater EGR rate than the low EGR condition.

2. The engine system of claim 1, wherein the control device controls the main spark plug and the subspark plug so that, during operation in the specific range, the ignition phase difference becomes larger as the EGR rate becomes higher.

3. The engine system of claim 2, wherein during operation in the specific range, the control device sets the subignition timing to a timing in expansion stroke.

4. The engine system of claim 3, wherein during operation in the specific range, the control device sets the main ignition timing to a timing in compression stroke.

5. The engine system of claim 1, wherein during operation in the specific range, the control device sets the subignition timing to a timing in expansion stroke.

6. The engine system of claim 1, wherein during operation in the specific range, the control device sets the main ignition timing to a timing in compression stroke.

7. The engine system of claim 1, wherein the main spark plug is attached so that an electrode part thereof is located on an intake port side in a ceiling surface of the main combustion chamber, and the subspark plug is attached to a position on an exhaust port side in the ceiling surface of the main combustion chamber.

8. The engine system of claim 2, wherein the main spark plug is attached so that an electrode part thereof is located on an intake port side in a ceiling surface of the main combustion chamber, and the subspark plug is attached to a position on an exhaust port side in the ceiling surface of the main combustion chamber.

9. The engine system of claim 3, wherein the main spark plug is attached so that an electrode part thereof is located on an intake port side in a ceiling surface of the main combustion chamber, and the subspark plug is attached to a position on an exhaust port side in the ceiling surface of the main combustion chamber.

10. The engine system of claim 4, wherein the main spark plug is attached so that an electrode part thereof is located on an intake port side in a ceiling surface of the main combustion chamber, and the subspark plug is attached to a position on an exhaust port side in the ceiling surface of the main combustion chamber.

11. The engine system of claim 5, wherein the main spark plug is attached so that an electrode part thereof is located on an intake port side in a ceiling surface of the main combustion chamber, and the subspark plug is attached to a position on an exhaust port side in the ceiling surface of the main combustion chamber.

12. The engine system of claim 6, wherein the main spark plug is attached so that an electrode part thereof is located on an intake port side in a ceiling surface of the main combustion chamber, and the subspark plug is attached to a position on an exhaust port side in the ceiling surface of the main combustion chamber.

13. The engine system of claim 1, wherein the injector is disposed so that a tip-end part thereof is located at the center of the ceiling surface of the main combustion chamber.

14. The engine system of claim 7, wherein the injector is disposed so that a tip-end part thereof is located at the center of the ceiling surface of the main combustion chamber.

15. The engine system of claim 8, wherein the injector is disposed so that a tip-end part thereof is located at the center of the ceiling surface of the main combustion chamber.

16. The engine system of claim 9, wherein the injector is disposed so that a tip-end part thereof is located at the center of the ceiling surface of the main combustion chamber.

17. The engine system of claim 10, wherein the injector is disposed so that a tip-end part thereof is located at the center of the ceiling surface of the main combustion chamber.

18. The engine system of claim 11, wherein the injector is disposed so that a tip-end part thereof is located at the center of the ceiling surface of the main combustion chamber.

19. The engine system of claim 12, wherein the injector is disposed so that a tip-end part thereof is located at the center of the ceiling surface of the main combustion chamber.

20. The engine system of claim 1, wherein in a low-load range where an engine load is below a given reference load, the control device is configured to control the injector to inject fuel during intake stroke.

* * * * *